US012706808B2

(12) United States Patent
Sampathkumar et al.

(10) Patent No.: US 12,706,808 B2
(45) Date of Patent: Aug. 11, 2026

(54) SYSTEMS AND METHODS FOR AN ADAPTIVE SMART MESH TOPOLOGY

(71) Applicant: PLUME DESIGN, INC., Palo Alto, CA (US)

(72) Inventors: Badri Srinivasan Sampathkumar, Fremont, CA (US); Justin Katz, Houston, TX (US)

(73) Assignee: PLUME DESIGN, INC., Palo Alto, CA (US)

(*) Notice: Subject to any disclaimer, the term of this patent is extended or adjusted under 35 U.S.C. 154(b) by 0 days.

(21) Appl. No.: 18/741,868

(22) Filed: Jun. 13, 2024

(65) Prior Publication Data

US 2025/0385840 A1 Dec. 18, 2025

(51) Int. Cl.
*H04L 41/12* (2022.01)
*H04L 41/14* (2022.01)
*H04L 67/50* (2022.01)

(52) U.S. Cl.
CPC .............. *H04L 41/12* (2013.01); *H04L 41/14* (2013.01); *H04L 67/535* (2022.05)

(58) Field of Classification Search
CPC ........ H04L 41/12; H04L 67/535; H04L 41/14
USPC .......................................................... 709/238
See application file for complete search history.

(56) References Cited

U.S. PATENT DOCUMENTS

2010/0208621 A1* 8/2010 Morper ................. H04W 8/005 370/255
2018/0103505 A1* 4/2018 Amini ................ G08B 13/2494
2021/0120454 A1* 4/2021 Chennichetty ....... H04B 7/0452
2021/0297128 A1* 9/2021 Badic ................... H04B 7/0617
2022/0294694 A1* 9/2022 Panje .................. H04L 41/0806

(Continued)

FOREIGN PATENT DOCUMENTS

EP 4213457 A1 * 7/2023 ............. H04L 41/12

OTHER PUBLICATIONS

M. Kretschmer, P. Batroff, C. Niephaus and G. Ghinea, "Topology discovery and maintenance for heterogeneous wireless back-haul networks supporting unidirectional technologies," 2011 IEEE 10th Malaysia International Conference on Communications , Sabah, Malaysia, 2011, pp. 1-6, (Year: 2011).*

(Continued)

*Primary Examiner* — Taylor A Elfervig
(74) *Attorney, Agent, or Firm* — Nicholas Martin; Greenberg Traurig, LLP

(57) ABSTRACT

Disclosed are systems and methods that provide a computerized network management framework that provides functionality for devices connected to and/or operating in proximity to WiFi networks. The framework can determine and implement functionalities for the design of a network topology, whereby redundant pathways can be ensured by providing multiple paths for data between nodes, enhancing reliability and load balancing. The disclosed framework can enable automatic reconfiguration if a node fails or new nodes are added, such that an automatic topology adaptation to current environments/conditions is provided. The framework provides a mesh solution that is dependent on each location's unique client landscape that provides functionality for customized mechanisms to inject device information into the mesh topology optimization.

20 Claims, 6 Drawing Sheets

(56) References Cited

U.S. PATENT DOCUMENTS

2024/0121632 A1 4/2024 Agarwal et al.

OTHER PUBLICATIONS

C. Niephaus, M. Kretschmer and K. Jonas, "QoS-aware Wireless Back-haul network for rural areas in practice, " 2012 IEEE Globecom Workshops, Anaheim, CA, USA, 2012, pp. 24-29, (Year: 2012).*

S. Vural, D. Wei and K. Moessner, "Survey of Experimental Evaluation Studies for Wireless Mesh Network Deployments in Urban Areas Towards Ubiquitous Internet," in IEEE Communications Surveys & Tutorials, vol. 15, No. 1, pp. 223-239, First Quarter 2013 (Year: 2013).*

M. Afanasyev, T. Chen, G. M. Voelker and A. C. Snoeren, "Usage Patterns in an Urban WiFi Network," in IEEE/ACM Transactions on Networking, vol. 18, No. 5, pp. 1359-1372, Oct. 2010 (Year: 2010).*

Z. Gu, J. Zhang and Y. Ji, "Resilience Aware Topology Formation in FSO-based Fronthaul/Backhaul Networks," 2018 Asia Communications and Photonics Conference (ACP), Hangzhou, China, 2018, pp. 1-3 (Year: 2018).*

Z. Gu, J. Zhang, Y. Ji, L. Bai and X. Sun, "Network Topology Reconfiguration for FSO-Based Fronthaul/Backhaul in 5G+ Wireless Networks," in IEEE Access, vol. 6, pp. 69426-69437, 2018 (Year: 2018).*

International Search Report and Written Opinion to corresponding Int'l Appln. No. PCT/US2025/031998 mailed Aug. 21, 2025 (12 pages).

* cited by examiner

SYSTEMS AND METHODS FOR AN ADAPTIVE SMART MESH TOPOLOGY

FIELD OF THE DISCLOSURE

The present disclosure is generally related to network management, and more particularly, to a decision intelligence (DI)-based computerized framework for a smart mesh topology.

SUMMARY OF THE DISCLOSURE

Disclosed are computerized systems and methods for a network management framework that provides novel network optimization for Wireless Fidelity (WiFi or Wi-Fi) networks. As discussed herein, the disclosed systems and methods provide functionality for a dynamically determined and implemented smart mesh topology that is robust, scalable and capable of handling network conditions. As provided herein, such predictive, proactive network topology determinations and implementations can ensure that the network remains functional and efficient as it evolves.

As discussed herein, mesh topology network is characterized by each node (or device) being interconnected with multiple other nodes, creating a web of communication pathways. Such architecture inherently supports robust fault tolerance and redundancy, maintaining network reliability even when individual nodes fail. However, the design and management of a mesh network require certain assumptions about the expected clients and network scale, especially in the absence of detailed client or device information (e.g., when it is not available or not requested for example).

According to some embodiments, a specific density of nodes distributed within the network area can be utilized. In some embodiments, such functionality can ensure effective coverage and connectivity, with nodes placed physically proximate (e.g., close) enough to maintain robust communication links, considering the typical transmission range of the devices. For example, in a Wi-Fi mesh network, nodes are often placed within a range of meters (e.g., 5-10 meters, for example) of each other to ensure optimal performance. Such planning helps determine the number of nodes required to cover a given area, ensuring seamless communication paths.

In some embodiments, the learned, typical traffic patterns and data flow can align with the intended use case, whether residential, commercial and/or industrial. Even without detailed client information, understanding the general use case aids systems to predict the volume and type of traffic the network will handle. For example, residential networks might prioritize high-speed internet access and multimedia streaming, while industrial networks might focus on low-latency communication for Internet of Things (IoT) devices. Accordingly, such determinations can guide the selection of appropriate hardware, such as high-throughput routers for commercial use, and the configuration of routing protocols like Dynamic Source Routing or Optimized Link State Routing to efficiently manage expected traffic loads.

In some embodiments, the network can be configured to be adaptable to scale up to accommodate a growing number of nodes over time. For example, such future growth can be based on industry standards, user patterns, patterns at the location of the network, similar network and/or projected user base increases, and the like. Scalability considerations can include, but are not limited to, supporting additional nodes without significant redesign, incorporating technologies such as mesh-capable routers with high processing power and memory, and using protocols like the Institute of Electrical and Electronic Engineers (IEEE) 802.11 family of standards (e.g., 802.11b/a/g/n/ac/ax/be) for wireless mesh networking, which supports dynamic network expansion.

Moreover, in some embodiments, nodes can have sufficient processing power, memory and/or battery life to perform necessary networking functions. For example, a baseline performance level allows the network to be designed with appropriate routing protocols and quality of service (QoS) measures, which can ensure that all nodes can effectively participate in the mesh network, maintaining overall performance. For example, devices such as, but not limited to, high-capacity routers and IoT gateways are selected based on these criteria.

In some embodiments, a network can operate in an environment with typical levels of interference for the chosen frequency band. Environmental factors, such as, but not limited to, physical obstructions, electromagnetic interference, and other radio frequency usage can be considered based on common scenarios. For example, urban areas might experience more Wi-Fi congestion compared to rural areas. Accordingly, as provided herein, such determination can facilitate functionality for selecting appropriate frequencies, power levels, redundancy strategies, and the like, to mitigate interference issues. For example, beamforming and channel bonding can be employed to enhance performance in high-interference environments.

Accordingly, as discussed herein, the disclosed systems and methods can determine and implement such functionalities in the design of a network topology, whereby redundant pathways can be ensured by providing multiple paths for data between nodes, enhancing reliability and load balancing. In some embodiments, self-healing protocols can be implemented, thereby allowing the network to automatically reconfigure if a node fails or new nodes are added, such that the disclosed framework can provide functionality for operations of an automatic topology adaptation to current environments/conditions.

Therefore, among other benefits, as discussed herein, the disclosed systems and methods can simplify network management and ensure consistent performance, involving the selection of devices with uniform specifications for central processing units (CPUs), memory and/or networking capabilities.

According to some embodiments, a method is disclosed for performing DI-based smart mesh topology management and control. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for performing DI-based smart mesh topology management and control.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
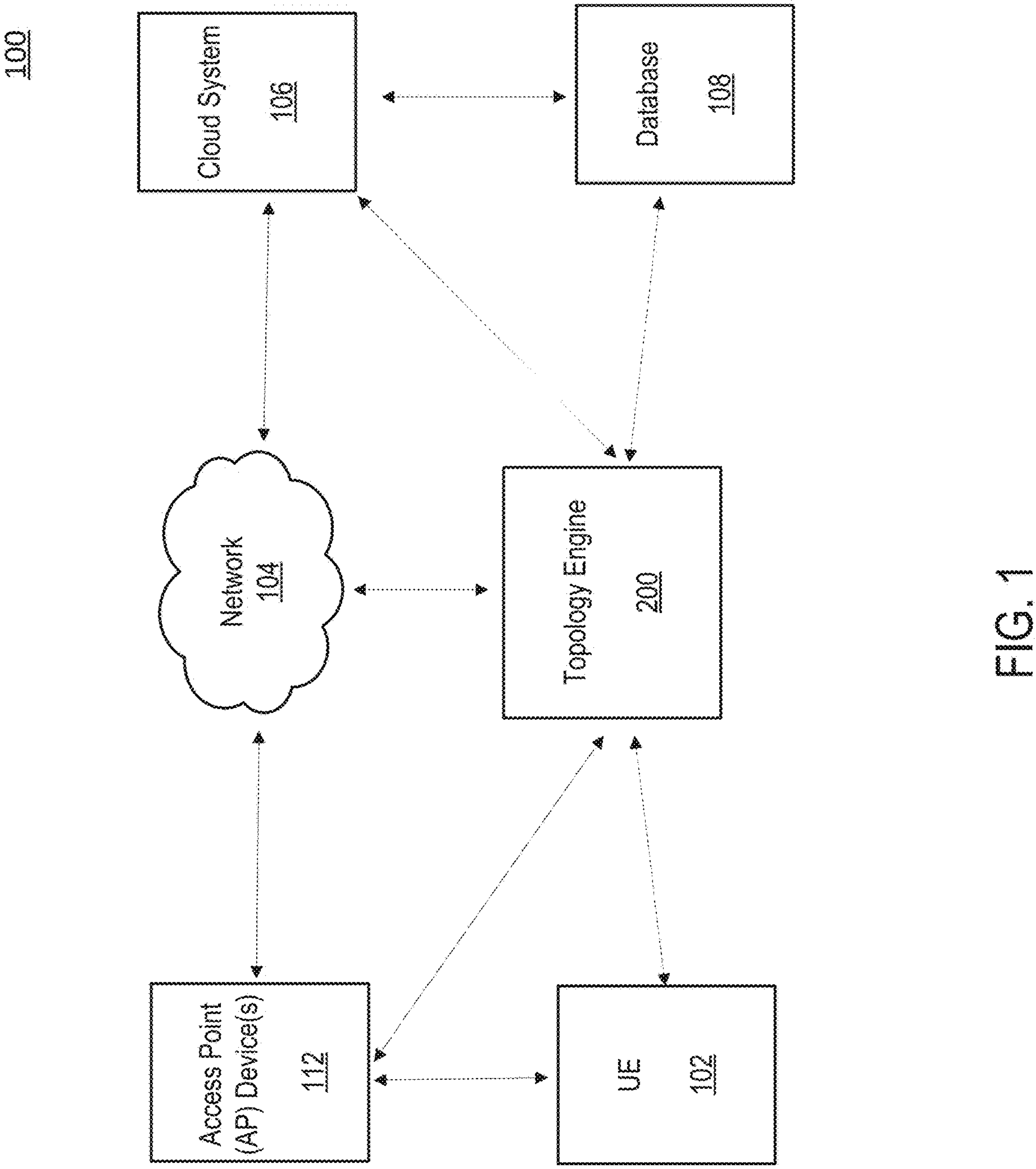
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/a/g/n/ac/ax/be, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution Screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 16), AP device 112, network 104, cloud system 106, database 108 and topology engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, Internet of Things (IoT) device, wearable device, autonomous machine, smart television, media streaming device, game console, and any other device equipped with a cellular or wireless or wired transceiver.

In some embodiments, peripheral devices (not shown) can be connected to UE 102, and can be any type of peripheral device, such as, but not limited to, a wearable device (e.g., smart ring, smart watch, for example), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, UE 102 can correspond to, but not be limited to, any type of device, component and/or sensor associated with a location of system 100 (referred to, collectively, as "sensors"). In some embodiments, the UE 102 can be any type of device that is capable of sensing and capturing data/metadata related to activity of the location. For example, the UE 102 can include, but not be limited to, cameras, motion detectors, door and window contacts, heat and smoke detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. In some embodiments, UE 102 can be associated with any device connected and/or operating on cloud system 106 (e.g., a cloud-based device, such as a server that collects information related to the location, for example).

According to some embodiments, AP device 112 is a device that creates and/or provides a wireless local area network (WLAN) for the location. According to some embodiments, the AP device 112 can be, but is not limited to, a router, switch, hub, gateway, extender and/or any other type of network hardware that can project a WiFi signal to a designated area. In some embodiments, UE 102 may be an AP device.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider (e.g., Plume Design®, for example), which has associated network resources hosted on the internet or private network (e.g., network 104), which enables (via engine 200) the network management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, and the services and applications provided by cloud system 106 and/or topology engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
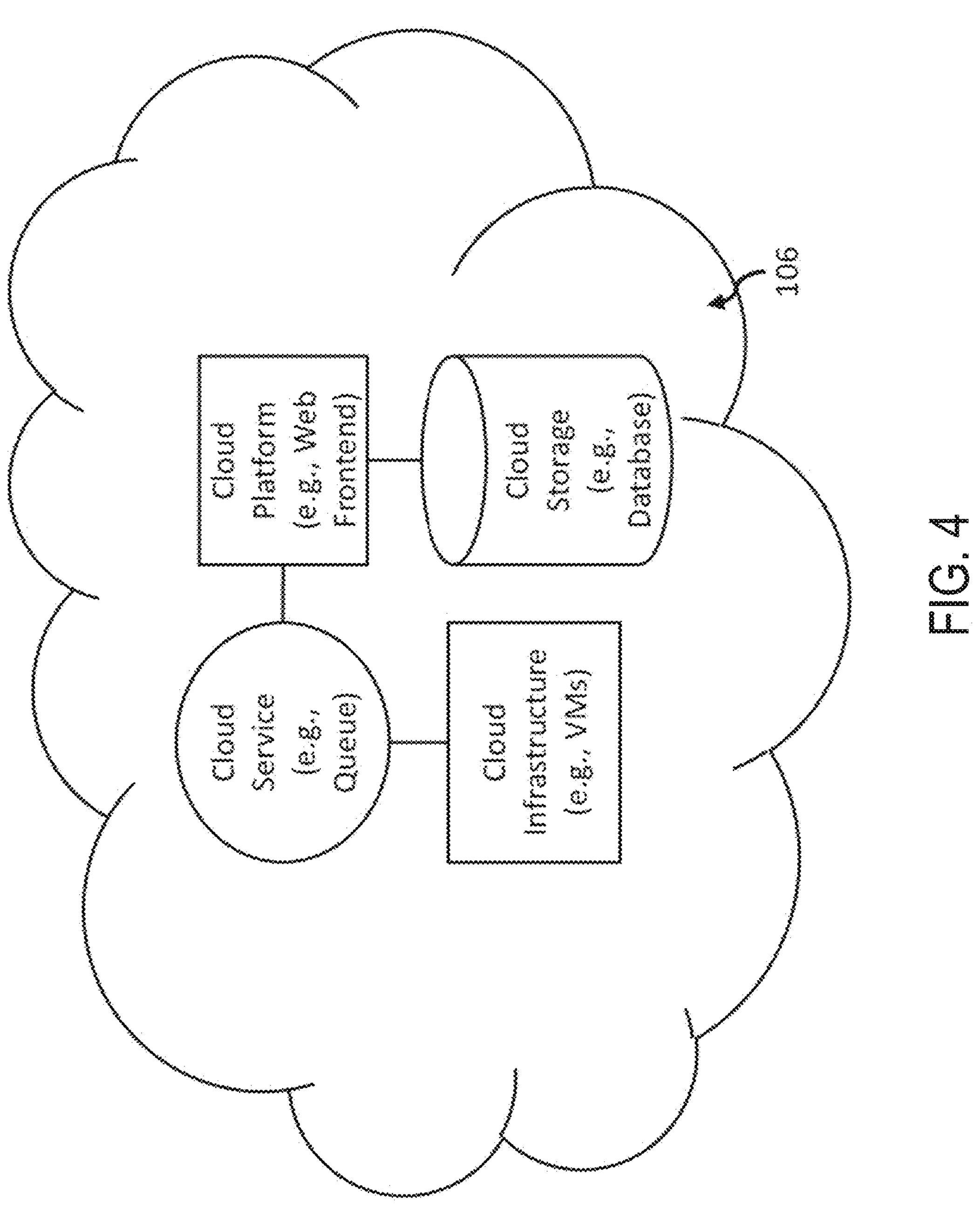
FIG. 4 depicts an exemplary implementation of an architecture according to some embodiments of the present disclosure.
Figure 5:
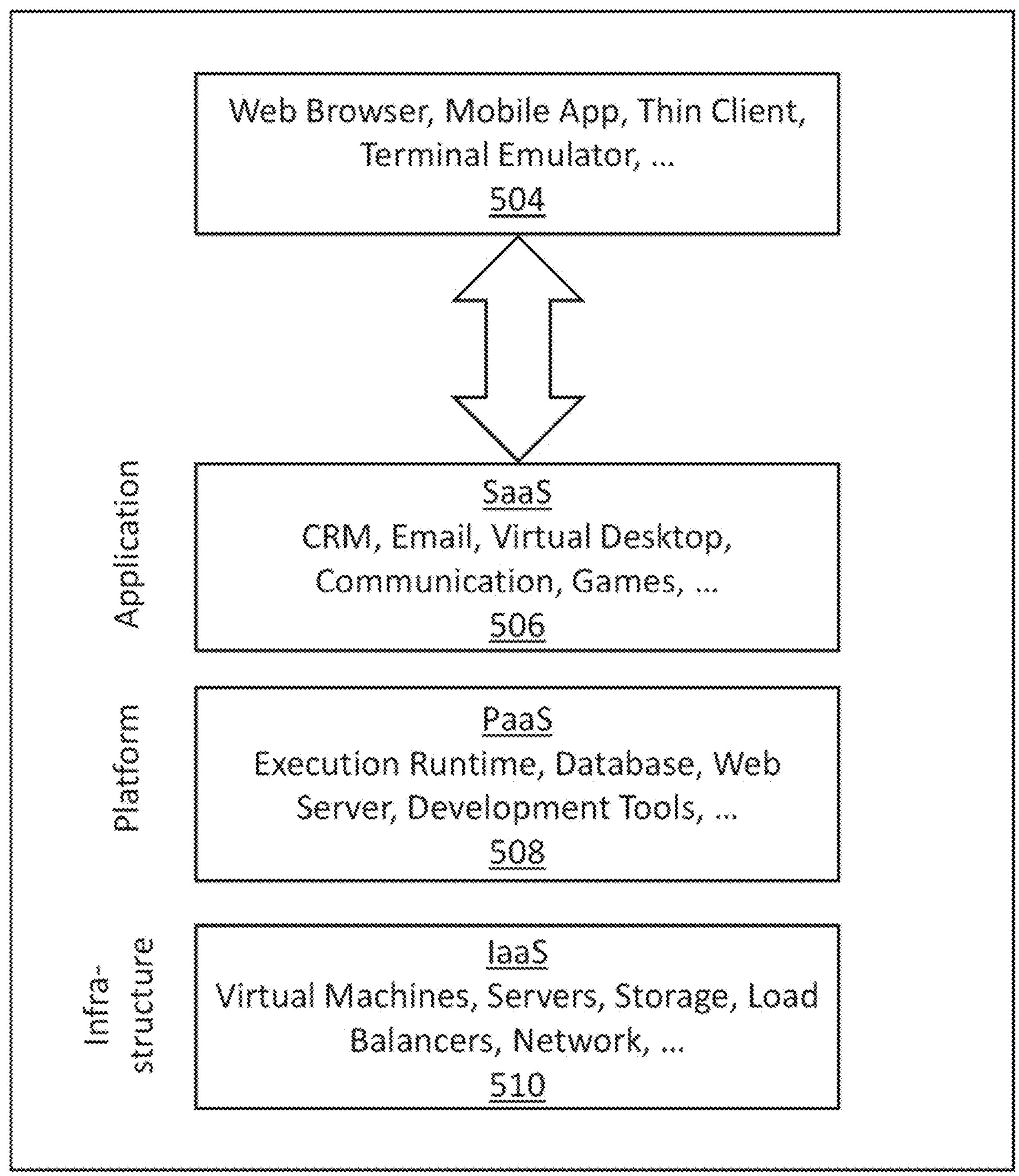
FIG. 5 depicts an exemplary implementation of an architecture according to some embodiments of the present disclosure.

Turning to FIGS. 4 and 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIGS. 4 and 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, structured query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Topology engine 200, as discussed above and further below in more detail, can include components for the disclosed functionality. According to some embodiments, topology engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

According to some embodiments, as discussed in more detail below, topology engine 200 may be configured to implement and/or control a plurality of services and/or microservices, where each of the plurality of services/microservices are configured to execute a plurality of workflows associated with performing the disclosed network management. Non-limiting embodiments of such workflows are discussed and provided below.

According to some embodiments, as discussed above, topology engine 200 may function as an application provided by cloud system 106. In some embodiments, engine 200 may function as an application installed on a server(s), network location and/or other type of network resource associated with system 106. In some embodiments, engine 200 may function as an application installed and/or executing on AP device 112 and/or UE 102. In some embodiments, such application may be a web-based application accessed by AP device 112 and/or UE 102, and/or devices accessible over network 104 from cloud system 106. In some embodiments, engine 200 may be configured and/or installed as an augmenting script, program or application (e.g., a plug-in or extension) to another application or program provided by cloud system 106 and/or executing on AP device 112 and/or UE 102.

Figure 2:
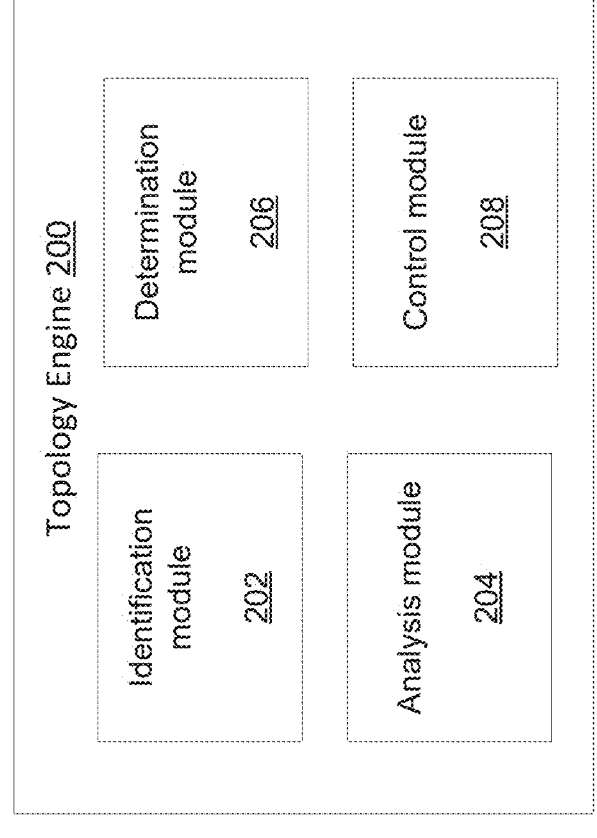
FIG. 2 is a block diagram illustrating components of an exemplary system according to some embodiments of the present disclosure.

As illustrated in FIG. 2, according to some embodiments, topology engine 200 includes identification module 202, analysis module 204, determination module 206 and control module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
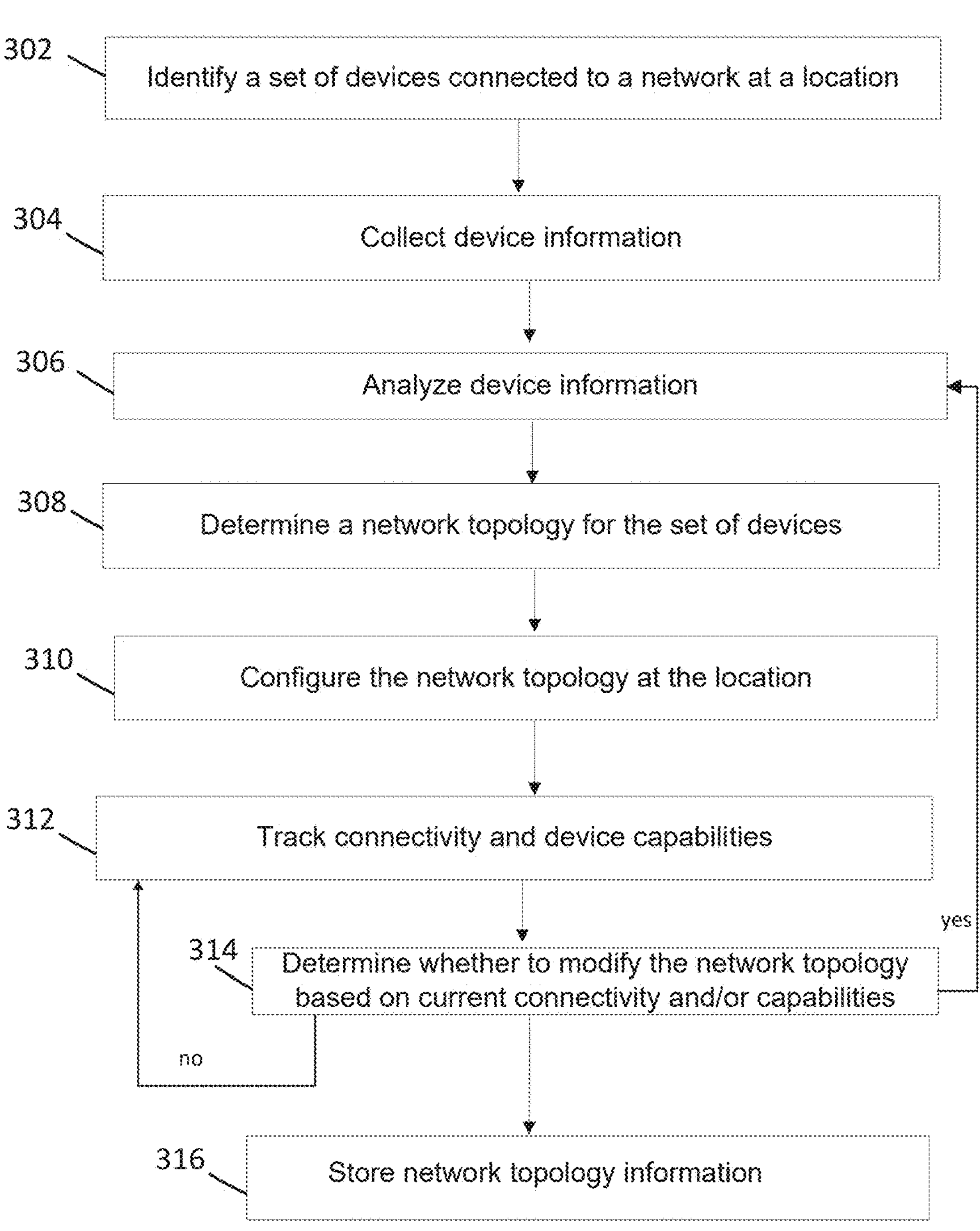
FIG. 3 illustrates an exemplary workflow according to some embodiments of the present disclosure.

Turning to FIG. 3, Process 300 provides non-limiting example embodiments for the disclosed network management framework. As discussed herein, according to some embodiments, without device (or node or client, used interchangeably) information, the mesh topology can make assumptions about expected device connections and/or activity, which can have a major impact on the network, at scale. For example, when one location has primarily 6 GHz capable devices and another location has primarily 5 GHz only devices, the optimal network topology per location would be different. Thus, as discussed herein, the disclosed framework can operate to track device information, which can be leveraged to manage the network topology, in a real-time manner, whereby fronthaul and/or backhaul links between nodes on network can be configured and managed accordingly to optimize (e.g., maximize) network connectivity.

According to some embodiments, as discussed below, the disclosed systems and methods can function a computerized methodology that is based on (1) tracking device capabilities such as (but not limited to): frequency bands supported, number of spatial streams supported (NSS), channel width supported, including NSS dependencies, WiFi standard generations support (e.g., WiFi 5/6/7, and the like), WiFi features supported (e.g., targeted wait time, preamble puncturing, and the like) that are relevant to fronthaul and/or backhaul connections, (2) adapting the optimal topology to the device landscape in the home, and (3) incorporating a spatial aspect where devices are correlated to specific zones in the location (e.g., for example, a laptop only used in the office of a home).

As provided below respective to the steps of Process 300, the disclosed framework can track device capabilities in a location (e.g. home, for example) and where they connect in the mesh topology. In addition, the framework's operation, in some embodiments, can construct and/or maintain the optimal topology for the location based on considerations related to how nodes are interacting with other nodes in the location (e.g., using 6 GHz to communicate vs 5 GHz, for example).

By way of a non-limiting example, a home has three (3) APs, where each AP has a 2.4G radio, 5 GHz radio, and 6 GHz radio. For example, the optimal topology can be a star topology (e.g., a topology where all leaf APs connect directly to the gateway), and an assumption is that the 5 GHz potential throughput is less (e.g., to at least a threshold value) than the 6 GHz throughput. As discussed infra, based on such information, a 6 GHz backhaul can be used to connect the leaf nodes to the gateway. However, if the home has 6 GHz preferred clients, then determining how the leaf nodes connect to the gateway needs to be revisited. In this scenario, for example, having 5 GHz backhaul connections allows for uninterrupted data flow from the client device(s) to the APs it connects to, and enables capabilities for an uninterrupted data flow between such APs since the client device(s) is operating on a 6 GHz link. Accordingly, given such considerations, managing the mesh topology requires an understanding of client capabilities in the location, as provided below.

Therefore, as discussed herein, the disclosed systems and methods provide customized mechanisms per network/location, rather than an all-inclusive solution for all types of networks. This enables each network to be customized to operate based on, but not limited to, device types, device capabilities, quantities of devices, device activities, device positions within the location, types of location, and the like, or some combination thereof. Thus, the disclosed framework provides a mesh solution that is dependent on each location's unique client landscape that provides functionality for customized mechanisms to inject device information into the mesh topology optimization.

According to some embodiments, Steps 302 and 304 of Process 300 can be performed by identification module 202 of topology engine 200; Steps 306 and 312 can be performed by analysis module 204; Steps 308 and 314 can be performed by determination module 206; and Steps 310 and 316 can be performed by control module 208.

According to some embodiments, Process 500 begins with Step 502 where engine 200 can identify a set of devices connected to a network (e.g., WiFi) associated with a location. According to some embodiments, the set of devices identified can correspond to and/or provide a mesh network topology of a network, as discussed above. In some embodiments, the set of devices can include, but are not limited to, APs, UEs, and the like (e.g., for example, gateway devices, routers, extenders, and the like, or some combination thereof), or some combination thereof.

In some embodiments, the set of devices can be devices that are connected to a network associated with the location, and/or connect to the network at least a threshold amount of times per a threshold amount of time (e.g., connects to the network at least 25 times per month, thereby indicating they live at the location).

According to some embodiments, a location can correspond to, but is not limited to, a home, office, building, and/or any other type of physical location that can be configured to host and/or provide network connectivity to devices in/around the geographic area. Accordingly, in some embodiments, the network, as discussed above, can be any type of communication network (e.g., a location-based or associated network such as a Wi-Fi network, for example) that can enable devices to automatically connect upon being within range of the location and/or access point devices providing the network at/around the location.

In some embodiments, Step 302 can further involve the identification of information, which can include, but is not limited to, a type of device, identity (ID) of device, MAC address or IP address of the device, the like, or some combination thereof.

In Step 304, for each device within the identified set of devices (from Step 302), engine 200 can collect device information. According to some embodiments, determining a mesh topology for a Wi-Fi network, as discussed herein, involves gathering and analyzing various types of data of device information to ensure optimal connectivity and performance. According to some embodiments, such device information includes, but is not limited to, the device's signal strength and quality, which are crucial for understanding how well devices can communicate with each other. In some embodiments, this can involve measuring the Received Signal Strength Indicator (RSSI) and Signal-to-Noise Ratio (SNR) to identify the best potential links between nodes. Additionally, knowing the bandwidth capacity and current load of each device can aid in balancing the network traffic effectively, ensuring no single node becomes a bottleneck.

In some embodiments, such device information can indicate device capabilities, such as, but not limited to, the supported Wi-Fi standards (e.g., 802.11n, 802.11ac, 802.11ax), the number of antennas (MIMO) capabilities, and the like. Such specifications can enable the determination of the data rate and range of each device, influencing where nodes should be placed relative to each other. Furthermore, information on device location, often acquired through GPS and/or network triangulation, can be used to map out physical positions, which helps in planning the mesh layout to cover the desired area efficiently.

In some embodiments, such device information can include network configuration settings, such as, but not limited to, channel frequency and width, which can be considered to avoid interference and optimize throughput. Additionally, device information can detail power settings and battery life, inter alia, ensuring that they remain operational and can sustain the network connectivity. Moreover, device information can further indicate a type of device or device designation (e.g., primary routers, repeaters, endpoints, and the like), which is critical for establishing a resilient and adaptive mesh topology. Further, such device information can indicate a spatial distribution of the set of devices at the location (e.g., how the devices are positioned in/at the location respective to other devices at the location).

Therefore, in some embodiments, as discussed above, the device information can include information related to, but not limited to, frequency bands supported, number of spatial streams supported (NSS), channel width supported, NSS dependencies, WiFi standard generations support (e.g., WiFi 5/6/7, and the like), spatial coordinates of the set of devices (e.g., at least one device) at the location, WiFi features supported (e.g., targeted wait time, preamble puncturing, and the like) that are relevant to fronthaul and/or backhaul connections, and the like, or some combination thereof. In some embodiments, such device information collected (and/or determined) in Step 304 can be stored in database 108, as discussed above. Thus, a comprehensive set of device information enables the creation of a robust Wi-Fi mesh network that can dynamically adjust to changing conditions and maintain seamless connectivity across all nodes.

In Step 306, engine 200 can analyze the device information (from Step 304). In some embodiments, engine 200 can analyze the collected device information by engine 200 executing a specific trained artificial intelligence (AI)/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, based on the analysis of the collected device information, in Step 308 engine 200 can determine a network topology for the set of devices. According to some embodiments, configuring a network topology involves a systematic approach to designing and implementing the layout of networking devices and connections within a network. As discussed herein, engine 200 can identify the specific requirements of the network, including factors like the number of devices, their locations, expected data traffic, security needs and scalability requirements, and based on such requirements, among others, engine 200 can determine a suitable network topology (e.g., a star, bus, ring, mesh, or hybrid configuration, for example).

According to some embodiments, determining a network (mesh) topology for the network can involve analyzing device information (e.g., via Step 306) to determine the best placement and configuration of devices within the location for optimal coverage and performance. According to some embodiments, as discussed above, key factors include, but are not limited to, assessing signal strength and quality between devices through metrics like RSSI and SNR, which help identify strong connections suitable for forming the backbone of the mesh network. Additionally, such topology can be based on each device's Wi-Fi standards, antenna configurations, and capabilities such as data rates and range assists in assigning roles within the network.

According to some embodiments, nodes with higher capabilities may act as central hubs, while others extend coverage or serve as endpoints. Analyzing network load and capacity can assist engine 200 in balancing traffic, while understanding device locations aids in mapping out physical positions to ensure even coverage and minimize dead zones. In some embodiments, configuration settings, such as channel frequency and power, can be optimized to avoid interference and maximize throughput. In some embodiments, defining the hierarchy and roles of devices, whether as routers, repeaters, or endpoints, helps establish a resilient and adaptable mesh topology that optimizes Wi-Fi performance across the network.

In some embodiments, the network topology determination between nodes can involve determining and configuring front haul and backhaul links to ensure efficient communication between nodes and providing seamless connectivity.

Front haul links refer to the connections between individual nodes within the mesh network (e.g., wireless connections between the APs in the network and the client devices connected to the network (e.g., UEs)). According to some embodiments, as discussed herein, determining front haul links can involve analyzing the signal strength and quality between adjacent nodes. By measuring parameters such as RSSI and SNR, engine 200 can identify strong and reliable connections suitable for front haul links. Once identified, front haul links can be configured by, for example, optimizing channel allocation, transmission power, and other network settings to ensure robust and stable communication between neighboring nodes.

Backhaul links serve as the backbone of the mesh network, connecting nodes to the wider network infrastructure or internet gateway. These links carry traffic between remote nodes and the central network gateway, enabling access to external resources and services. According to some embodiments, as discussed herein, determining backhaul links involves identifying the most efficient paths for data transmission based on factors such as signal strength, network load, and available bandwidth. In some embodiments, this may require deploying dedicated backhaul nodes strategically positioned to establish reliable connections between remote nodes and the central gateway. In some embodiments, configuration of backhaul links involves, for example, optimizing network settings such as channel allocation, transmission power, and routing protocols to ensure high-speed and low-latency communication between nodes and the central gateway.

In some embodiments, engine 200 can deploy known or to be known routing algorithms to dynamically determine the route/paths for data transmission (e.g., to/from nodes—e.g., front haul and/or backhaul) based on real-time network conditions.

For example, such algorithms can include distance vector routing, which operates by having each node in the network maintain a table of distances to all other nodes. Periodically, nodes exchange routing information with their neighbors, updating their distance vectors accordingly. Examples include the Bellman-Ford algorithm and the Routing Information Protocol (RIP).

In another example, in link state routing each node in the network maintains a map, or "link-state," of the entire network topology. Nodes periodically exchange link-state packets to update their maps. Using these maps, nodes independently calculate the shortest path to all other nodes using algorithms like Dijkstra's algorithm. Examples include Open Shortest Path First (OSPF) and Intermediate System to Intermediate System (IS-IS).

In another example, similar to distance vector routing, path vector routing also relies on nodes exchanging routing information. However, instead of just distance information, nodes exchange information about the entire path to each destination. Path vector routing is commonly used in large-scale networks like the Internet, with the Border Gateway Protocol (BGP) being a prominent example.

In another example, flooding can be utilized which involves a node forwarding incoming packets to all of its neighbors except the one from which the packet arrived. This methodology ensures that the packet reaches all nodes in the network but may result in redundant transmission and network congestion without proper mechanisms to control it, such as Time-to-Live (TTL) counters.

In another non-limiting example, hybrid routing can be used, where elements of multiple routing algorithms can be combined to balance efficiency and scalability. For example, Enhanced Interior Gateway Routing Protocol (EIGRP) combines aspects of distance vector and link-state routing.

And in yet another non-limiting example, routing metrics-based routing can be used, in that routing decisions can be based on metrics other than distance or cost, such as available bandwidth, delay, reliability, load, and the like. Such metrics can be factored into routing decisions to optimize network performance and resource utilization.

Accordingly, such routing algorithms can vary in their complexity, scalability and suitability for different network environments/locations, and can depend on factors such as network size, topology, traffic patterns, and/or quality of service requirements. Thus, by continuously monitoring parameters such as signal strength, network congestion, and link quality, routing protocols can adaptively route traffic through the most efficient front haul and backhaul links. Such dynamic routing and optimization process ensures that data is transmitted reliably and efficiently across the mesh network, maximizing overall network performance and scalability. Indeed, by determining and configuring front haul and backhaul links effectively, engine 200 can optimize the performance and reliability of smart mesh networks, ensuring seamless connectivity and efficient data transmission across the entire network infrastructure.

In some embodiments, the information related to the determined network topology can be stored in database 108, discussed supra.

In Step 310, engine 200 can operate to configure the network topology at the location, respective to the set of devices (in Step 302) and based on the determined topology (from Step 308). Thus, once the topology is determined (or selected), as per Step 308, discuss supra, the physical layout of devices, cables, and other networking equipment can be planned, taking into account factors such as distance limitations, cable types, and environmental conditions. In some embodiments, engine 200 can assign IP addresses to devices within the network, either statically or dynamically using DHCP. In some embodiments, engine 200 can configure individual networking devices according to the chosen topology, with settings such as IP addresses, subnet masks, gateway addresses, VLANs, and security policies. Accordingly, devices can then be connected and verified (and/or troubleshot).

As provided below, engine 200 can operate to perform continuous monitoring and maintenance to ensure that the network remains functional, secure and reliable, with adjustments made as needed to adapt to changes in requirements or address any issues. Accordingly, as discussed herein, as the network grows or requirements change, the topology can be scaled and expanded by adding new devices, modifying configurations and/or redesigning the topology to accommodate evolving needs of the devices/networks.

Thus, as a result of Step 310, the determined and configured network topology (from Steps 308-310) is implemented, and the set of devices are operating on the network at the location via the configuration enabled.

In Step 312, engine 200 track connectivity and/or device capabilities to ensure the viability of the network topology implemented in Step 310, discussed supra. In some embodiments, engine 200 can function to monitor for (e.g., continuously, periodically and/or according to a criteria (e.g., time, event-based, and the like)) and determine, detect or otherwise identify information related to an event that corresponds to a need for topology change of the mesh network. In some embodiments, as discussed herein, the topology change detection can be based on and/or in accordance with the device information/connectivity (from Step 304, for example) being further collected and analyzed, which can be performed in a similar manner as discussed above.

In Step 314, engine 200 can determine whether to modify the network topology based on current connectivity and/or capabilities of the devices/network. For example, has another device connected, is a 5 GHz connection capable of handling a device's requests, and the like. Thus, in some embodiments, such determination can be based on whether connectivity and/or device metrics satisfy a threshold (or fall below specific thresholds)—for example, network bandwidth, latency, throughput, and the like, are at or below threshold levels that indicate the current topology is not operational for the current network load. In another example, interference levels are at or above a threshold value, thereby indicating the topology is causing interference for a device(s) that can be avoided via another topology configuration.

According to some embodiments, a mesh network topology change refers to a modification or reconfiguration of the network's structure and connectivity pattern. In a mesh network, devices are interconnected with multiple paths, allowing data to travel through different routes to reach its destination. When a topology change occurs, the arrangement of such connections is altered, which can occur for various reasons, such as, but not limited to, adding new devices to the network, removing existing devices, repositioning devices to optimize performance or extend coverage, and the like, or some combination thereof. According to some embodiments, such processing can involve updating the routing tables and establishing new links between devices. As discussed herein, such updating can improve how the network scales and responds to evolving requirements and conditions so as to provide continuous, efficient data transmission and reliable connectivity.

Accordingly, in Step 314, when engine 200 determines that a topology change is required for the network, engine 200 can proceed back to Step 306, whereby the further collected device information can be analyzed and leveraged to determine an updated network topology based on the updated network conditions. And, in Step 314, when engine 200 determines that a topology change is not required for the network (e.g., connectivity levels are satisfying certain thresholds, as discussed above, for example), engine can continue tracking and monitoring the network conditions, which can be performed periodically or continuously, as discussed supra.

And, in Step 316, engine 200 can store the network topology information, which can include information indicating, but not limited to, the current topology, the determination of whether to change the topology, the device and/or connectivity information (from Step 312), and the like, or some combination thereof.

Figure 6:
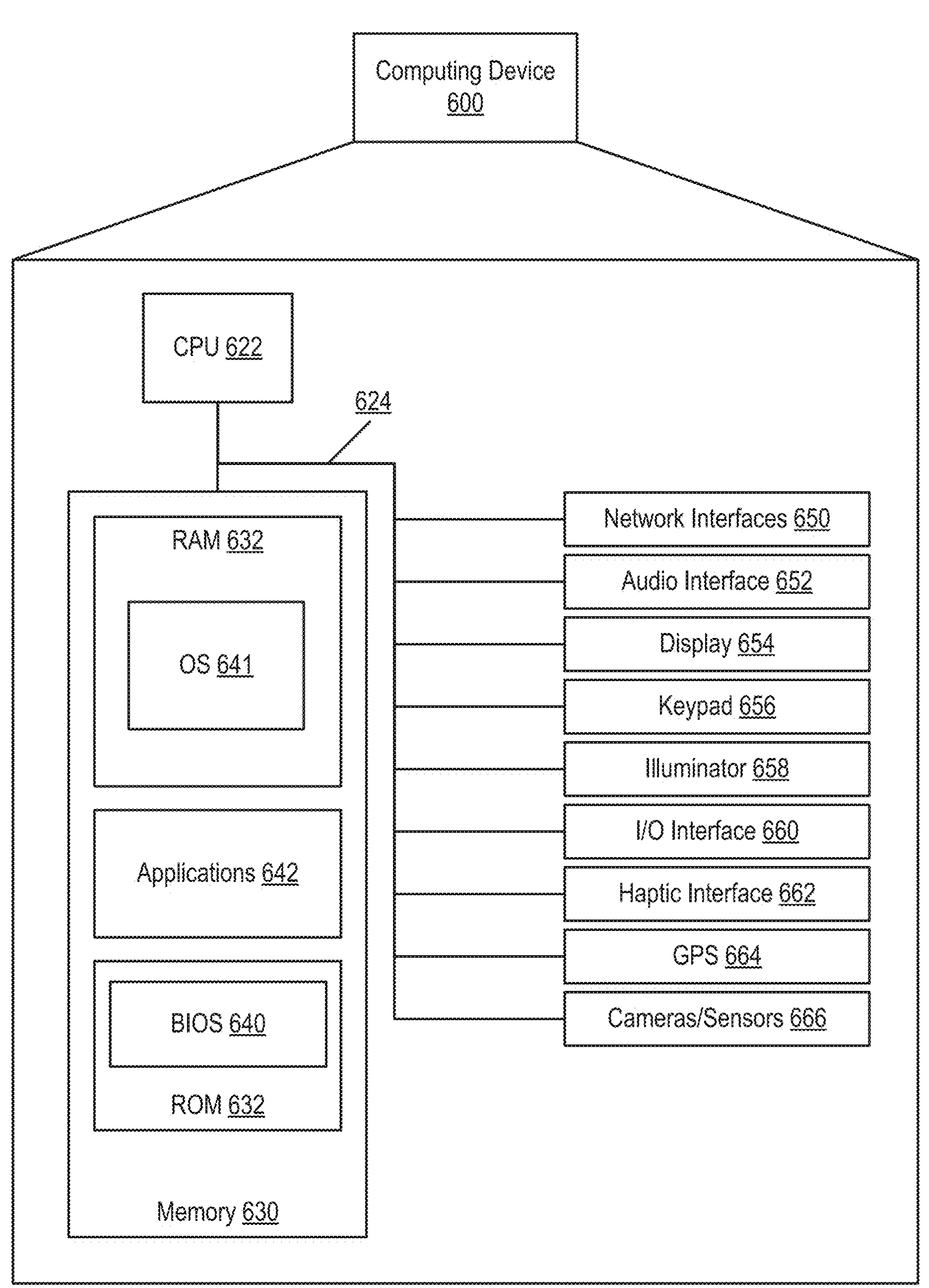
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, tri-angulation, assisted GPS (AGPS), E-OTD, CI, SAI, ETA, BSS or the like, to further determine the physical location of client device 600 on the surface of the Earth. In one embodiment, however, Client device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

According to some embodiments, certain aspects of the instant disclosure can be embodied via functionality discussed herein, as disclosed supra. According to some embodiments, some non-limiting aspects can include, but are not limited to the below method aspects, which can additionally be embodied as system, apparatus and/or device functionality:

Aspect 1. A method comprising:

identifying, by a device, a set of devices at a location, the location have an associated network, the network being a WiFi network;

collecting, by the device, information related to the set of devices, the information, for each of the set of devices, indicating capabilities of a respective device for connecting to other devices within the set of devices over the network, the information further indicating a spatial distribution of the set of devices at the location;

analyzing, by the device, the collected information, and determining a network topology for the set of devices, the determined network topology being a type of mesh network topology; and configuring, by the device, the network based on the determined network topology, the configuration causing front haul and back haul links between the set of devices to be established in accordance with each device's capabilities and the type of the mesh network topology.

Aspect 2. The method of aspect 1, further comprising:

tracking network activity for the set of devices, the network activity occurring via the configured network;

further collecting, based on the tracked network activity, information related to the set of devices;

further analyzing the further collected information; and determining whether to modify the determined network topology of the configured network.

Aspect 3. The method of aspect 2, further comprising:

determining an updated network topology for the network when the determination indicates a need to update the determined network topology, the need corresponding to connectivity parameters being at or below particular connectivity thresholds; and reconfiguring the network according to the updated network topology.

Aspect 4. The method of aspect 2, wherein the determined network topology is maintained when the determining indicates a modification is not required based on connectivity parameters satisfying particular connectivity thresholds.

Aspect 5. The method of aspect 1, wherein the information related to the set of devices indicates at least one of frequency bands supported, number of spatial streams supported (NSS), channel width supported, NSS dependencies, WiFi standard generations support, WiFi features supported, spatial coordinates of the set of devices (e.g., at least one device) at the location, network connectivity data and device types.

Aspect 6. The method of aspect 1, wherein the set of devices comprise at least one of a client device an access point device for a location.

Aspect 7. The method of aspect 1, further comprising:

storing information related to the configured network within a database.

Aspect 8. The method of aspect 7, wherein the database is located on a Cloud.

Aspect 9. The method of aspect 1, wherein the device is a cloud device.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

identifying, by a device, a set of devices at a location, the location have an associated network, the network being a WiFi network;

collecting, by the device, information related to the set of devices, the information, for each of the set of devices, indicating capabilities of a respective device for connecting to other devices within the set of devices over the network, the information further indicating a spatial distribution of the set of devices at the location;

analyzing, by the device, the collected information, and determining a network topology for the set of devices, the determined network topology being a type of mesh network topology, wherein the determining the network topology comprises correlating devices to specific zones in the location to indicate the spatial distribution of the set of devices and using WiFi capability data including at least frequency bands supported, number of spatial streams supported (NSS), and channel width supported; and configuring, by the device, the network based on the determined network topology, the configuration causing front haul and back haul links between the set of devices to be established in accordance with each device's capabilities and the type of the mesh network topology, including assigning front haul and back haul links for devices correlated to the specific zones in the location according to the determined network topology and the respective WiFi capabilities.

2. The method of claim 1, further comprising:

tracking network activity for the set of devices, the network activity occurring via the configured network;

further collecting, based on the tracked network activity, information related to the set of devices;

further analyzing the further collected information; and determining whether to modify the determined network topology of the configured network.

3. The method of claim 2, further comprising:

determining an updated network topology for the network when the determination indicates a need to update the determined network topology, the need corresponding to connectivity parameters being at or below particular connectivity thresholds; and reconfiguring the network according to the updated network topology.

4. The method of claim 2, wherein the determined network topology is maintained when the determining indicates a modification is not required based on connectivity parameters satisfying particular connectivity thresholds.

5. The method of claim 1, wherein the information related to the set of devices indicates at least one of frequency bands supported, number of spatial streams supported (NSS), channel width supported, NSS dependencies, WiFi standard generations support, WiFi features supported, spatial coordinates of the set of devices at the location, network connectivity data and device types.

6. The method of claim 1, wherein the set of devices comprise at least one of a client device an access point device for a location.

7. The method of claim 1, further comprising:

storing information related to the configured network within a database.

8. The method of claim 7, wherein the database is located on a Cloud.

9. The method of claim 1, wherein the device is a cloud device.

10. A device comprising:

a processor configured to:

identify a set of devices at a location, the location have an associated network, the network being a WiFi network;

collect information related to the set of devices, the information, for each of the set of devices, indicating capabilities of a respective device for connecting to other devices within the set of devices over the network, the information further indicating a spatial distribution of the set of devices at the location;

analyze the collected information, and determine a network topology for the set of devices, the determined network topology being a type of mesh network topology, wherein the determining the network topology comprises correlating devices to specific zones in the location to indicate the spatial distribution of the set of devices and using WiFi capability data including at least frequency bands supported, number of spatial streams supported (NSS), and channel width supported; and configure the network based on the determined network topology, the configuration causing front haul and back haul links between the set of devices to be established in accordance with each device's capabilities and the type of the mesh network topology, including assigning front haul and back haul links for devices correlated to the specific zones in the location according to the determined network topology and the respective WiFi capabilities.

11. The device of claim 10, wherein the processor is further configured to:

track network activity for the set of devices, the network activity occurring via the configured network;

further collect, based on the tracked network activity, information related to the set of devices;

further analyze the further collected information; and determine whether to modify the determined network topology of the configured network.

12. The device of claim 11, wherein the processor is further configured to:

determine an updated network topology for the network when the determination indicates a need to update the determined network topology, the need corresponding to connectivity parameters being at or below particular connectivity thresholds; and reconfigure the network according to the updated network topology.

13. The device of claim 11, wherein the determined network topology is maintained when the determining indicates a modification is not required based on connectivity parameters satisfying particular connectivity thresholds.

14. The device of claim 10, wherein the information related to the set of devices indicates at least one of frequency bands supported, number of spatial streams supported (NSS), channel width supported, NSS dependencies, WiFi standard generations support, WiFi features supported, spatial coordinates of the set of devices at the location, network connectivity data and device types.

15. The device of claim 10, wherein the set of devices comprise at least one of a client device an access point device for a location.

16. The device of claim 10, wherein the processor is further configured to:

store information related to the configured network within a database, wherein the database is located on a Cloud, wherein the device is a cloud device.

17. A non-transitory computer-readable storage medium tangibly encoded with computer-executable instructions that when executed by a device, perform a method comprising steps of:

identifying, by a device, a set of devices at a location, the location have an associated network, the network being a WiFi network;

collecting, by the device, information related to the set of devices, the information, for each of the set of devices, indicating capabilities of a respective device for connecting to other devices within the set of devices over the network, the information further indicating a spatial distribution of the set of devices at the location;

analyzing, by the device, the collected information, and determining a network topology for the set of devices, the determined network topology being a type of mesh network topology, wherein the determining the network topology comprises correlating devices to specific zones in the location to indicate the spatial distribution of the set of devices and using WiFi capability data including at least frequency bands supported, number of spatial streams supported (NSS), and channel width supported; and configuring, by the device, the network based on the determined network topology, the configuration causing front haul and back haul links between the set of devices to be established in accordance with each device's capabilities and the type of the mesh network topology, including assigning front haul and back haul links for devices correlated to the specific zones in the location according to the determined network topology and the respective WiFi capabilities.

18. The non-transitory computer-readable storage medium of claim 17, further comprising:

tracking network activity for the set of devices, the network activity occurring via the configured network;

further collecting, based on the tracked network activity, information related to the set of devices;

further analyzing the further collected information; and determining whether to modify the determined network topology of the configured network.

19. The non-transitory computer-readable storage medium of claim 18, further comprising:

determining an updated network topology for the network when the determination indicates a need to update the determined network topology, the need corresponding to connectivity parameters being at or below particular connectivity thresholds; and reconfiguring the network according to the updated network topology.

20. The non-transitory computer-readable storage medium of claim 18, wherein the determined network topology is maintained when the determining indicates a modification is not required based on connectivity parameters satisfying particular connectivity thresholds.

* * * * *